March 4, 1930. T. C. WILLSON 1,749,012
CAMERA CARRYING AND SUPPORTING MEANS
Filed Nov. 14, 1927 2 Sheets-Sheet 2
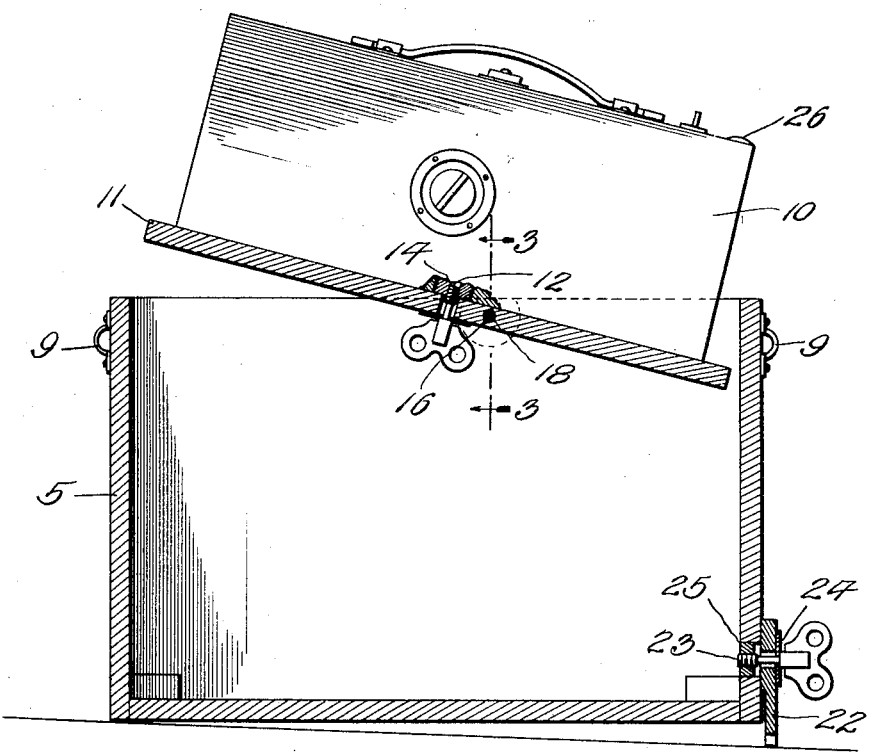
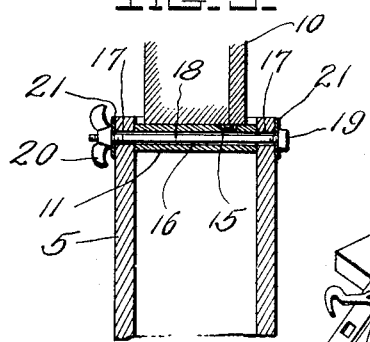
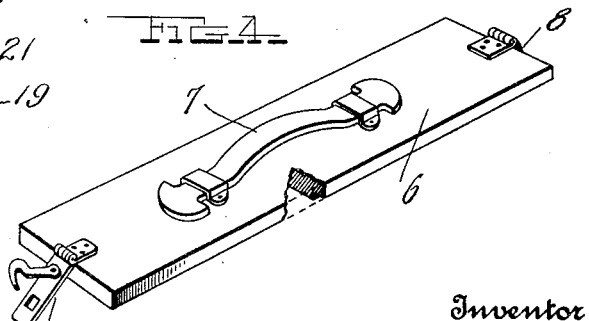
Witness
J. P. Pirce.
Inventor
T. C. Willson,
By H. B. Willson & Co.
Attorneys Patented Mar. 4, 1930

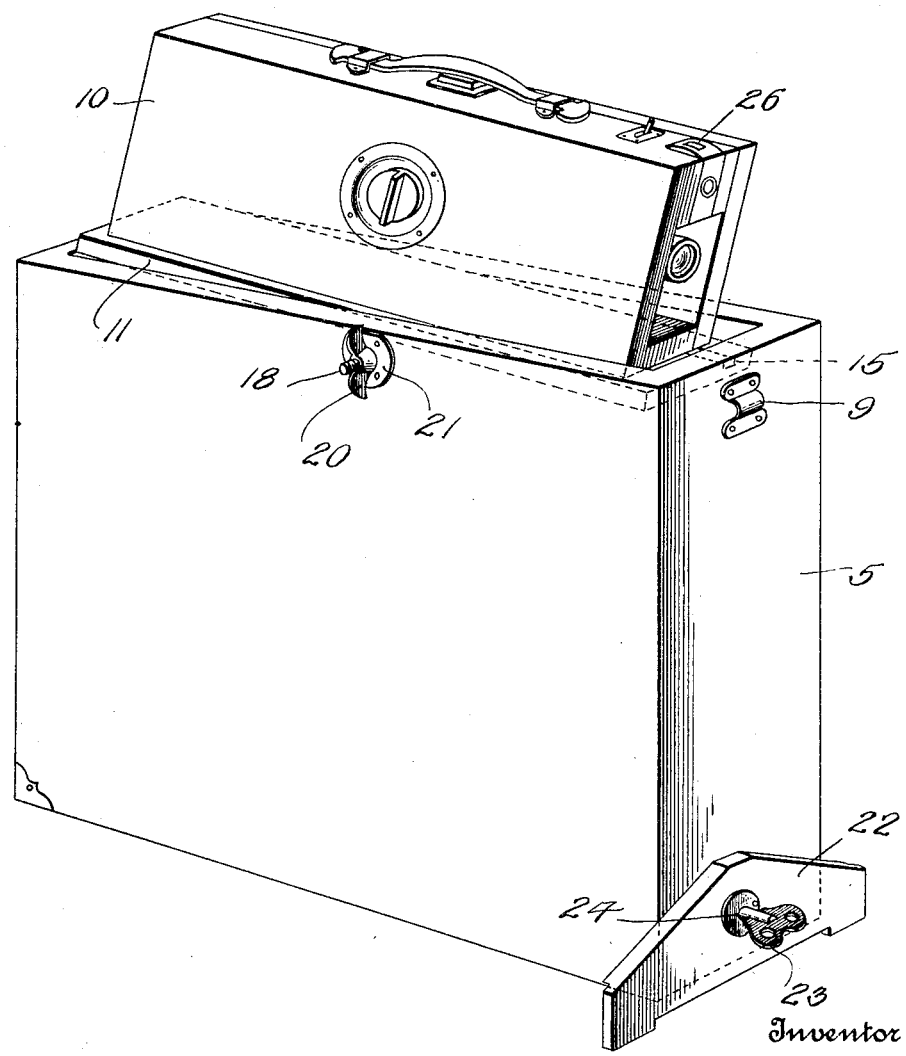

1,749,012

UNITED STATES PATENT OFFICE

THOMAS CARROLL WILLSON, OF PHILADELPHIA, PENNSYLVANIA

CAMERA CARRYING AND SUPPORTING MEANS

Application filed November 14, 1927. Serial No. 233,163.

The invention aims to provide a new and improved assemblage of parts in which a carrying case for a camera is usable also as a stand therefor and permits tilting adjustment of the camera in any desired direction, and by the use of such a convertible structure, the necessity of using a tripod is obviated.

Further objects are to provide novel means for pivotally mounting the camera at the upper end of the case, and to make unique provision for tilting the case into desired angular relation with a supporting surface, such as a desk or table top.

Yet another aim is to provide a construction which will be simple and inexpensive, yet will be durable, efficient and in every way desirable.

With the foregoing in view, the invention resides in the novel subject matter hereinafter described and claimed, the description being supplemented by the accompanying drawings.

Fig. 1 is a perspective view showing the camera supported upon the case and tilted somewhat.

Fig. 2 is a central vertical longitudinal sectional view partly in elevation, the camera being tilted to an excessive extent for purpose of illustration.

Fig. 3 is a detail vertical transverse section on line 3—3 of Fig. 2.

Fig. 4 is a perspective view of the cover which is connected with the case when the camera and other parts are housed within said case.

In the drawings above briefly described, the numeral 5 designates a rectangular case for which a suitable cover 6, having a carrying handle 7, is provided, co-acting fastening means 8 and 9 being provided on the cover and case for detachably connecting them.

10 designates a camera to be carried in the case 5, and provision is made whereby said camera may be moved to the upper end of the case and supported by the latter for use. I prefer to provide a base 11 for the camera 10, provided with a swiveled screw 12 for engagement with the usual tripod attaching nut 14 of the camera, and if the latter be provided with hinges at its bottom, the base 11 may be provided with a groove 15 to receive these hinges.

A transverse opening 16 is formed in the base 11 for alinement with openings 17 near the upper ends of the opposed side walls of the case 5, so that a bolt or analogous rod 18 normally carried within the case 5, may be passed through these openings to pivotally support the base. This bolt 18 is provided at one end with a head 19 and at its other end with a wing-nut 20, and the sides of the case are preferably provided with plates 21 for engagement with said head and nut. When the nut 20 is tightened, the side walls of the case 5 are drawn into frictional contact with the edges of the base 11, for the purpose of clamping the base at any position to which it has been adjusted about the bolt 18, as a pivot.

A foot 22 is normally carried within the case 5 but is removable therefrom and is then usable to support the case 5 in desired angular relation with a supporting surface, for instance, a desk or table top. In the present disclosure, the foot 22 is horizontally elongated and is intended to contact with one end of the case 5, and a suitable screw 23 is swiveled at 24 in said foot for engagement with a nut 25 which is inset in said end of the case. When the foot 22 is taken from the case 5, it may readily be connected with the exterior of said case by threading the screw 23 into the nut 25 and it will be observed that the screw then forms a pivot which permits lateral tilting of said case into any desired angular relation with the supporting surface. The case may be held in the position to which it has been adjusted, by tightening the screw.

The camera 10, its base 11, the foot 22, and the bolt 18 may be conveniently carried within the case 5, together with any other desired photographic equipment, and whenever the use of the camera is desired, the parts may be relatively connected as shown in Figs. 1, 2 and 3, and when the case 5 is placed on a suitable supporting surface, the camera may be forwardly or rearwardly tilted, or tilted laterally to properly position the subject in the finder 26. The invention is intended primarily for use when taking a number of pictures in a schoolroom, a lodge or the like, and it not only affords efficient means for photographing the subjects, but for carrying, mailing or shipping all necessary equipment to and from the building in which the photographs are taken. As the case 5 and associated parts provide for supporting and adjusting the camera, it is not necessary to accompany the latter with a tripod and hence trouble and inconvenience are avoided.

On account of the excellent results obtainable from the details disclosed, they are preferably followed. However, within the scope of the invention as claimed, variations may be made.

What is claimed is:—

1. A camera carrying and supporting means comprising a case, means for supporting a camera at the upper end of said case, and adjustable means for supporting the latter in desired angular relation with a supporting surface.

2. A camera carrying and supporting means comprising a case, means for supporting a camera at the upper end of said case, and adjustable means for supporting the latter in desired angular relation with a supporting surface.

3. A camera carrying and supporting means comprising a case, means for pivotally supporting the camera at the upper end of said case, and adjustable means for supporting the latter in desired angular relation with a supporting surface.

4. A camera carrying and supporting means comprising a case, by which a camera may be supported, and adjustable means for supporting the case in desired angular relation with a supporting surface.

5. A camera carrying and supporting means comprising a case by which a camera may be supported, a foot, and means for adjustably connecting said foot with the exterior of the case to support the latter in desired angular relation with a supporting surface.

6. A camera carrying and supporting means comprising a case by which a camera may be supported, a foot, a combined pivot and clamping screw swiveled in said foot, and a nut carried by the case and exposed at the exterior thereof to receive said screw.

7. A camera carrying and supporting means comprising a case, and means for pivotally mounting the camera at the upper end of said case for use.

8. A camera carrying and supporting means comprising a case in which the camera is carried, a base, means for securing the camera to said base, and means for pivotally mounting said base at the upper end of said case.

9. A camera carrying and supporting means comprising a case, a base, means for securing the camera to said base, and a combined pivot and clamping bolt, said base and opposed side walls of said case being formed with openings to jointly receive said bolt for the purpose of pivotally mounting the base at the upper end of said case.

10. An assemblage of the class described comprising a case, a camera between the upper ends of opposed side walls thereof, and means pivotally supporting the camera on said walls.

11. An assemblage of the class described comprising a case, a camera, and a rod, opposed side walls of said casing having openings through which said rod passes, and camera-supporting means engaging said rod to pivotally support said camera.

12. An assemblage of the class described comprising a case, a camera, and a rod, opposite side walls of said case having openings through which said rod passes, and camera-supporting means engaging said rod to pivotally support said camera, said camera-supporting means frictionally engaging said side walls to hold the camera in adjusted position.

13. A camera carrying and supporting means embodying a camera-supporting case and means whereby the camera may be tilted with respect to a supporting surface, to properly position it for use.

14. A camera carrying and supporting means, embodying a camera-supporting case and means whereby the camera may be tilted about either a longitudinal or a transverse axis, to properly position it for use.

In testimony whereof I have hereunto affixed my signature.

THOMAS CARROLL WILLSON.